Oct. 25, 1960 M. O. HOLOWATY ET AL 2,957,349

TEMPERATURE MEASURING SYSTEM

Filed Dec. 16, 1957

Inventors
Michael O. Holowaty
Leslie M. Bernick
By Byron, Hume, Groen & Clement
Attorneys United States Patent Office 2,957,349

Patented Oct. 25, 1960

2,957,349

TEMPERATURE MEASURING SYSTEM

Michael O. Holowaty, Gary, Ind., and Leslie M. Bernick, Calumet City, Ill., assignors to Inland Steel Company, Chicago, Ill., a corporation of Delaware Filed Dec. 16, 1957, Ser. No. 702,878

14 Claims. (Cl. 73—351)

This invention pertains to pressure rolls and in particular to an improved apparatus and method for accurately measuring and controlling the temperature of such rolls.

In the processing of materials through pressure rolls, particularly metals, it is critical that the rolls be maintained at some uniform operating temperature. It has been found in the operation of steel rolling mills the temperatures at the ends of the rolls tend to vary a considerable amount from that at the center of the rolls. Generally the temperature at the ends of the rolls is considerably less than that at the center of the roll. This difference in temperature along the axis of the roll can cause a considerable amount of distortion and other defects in the metal plate passing through the rolls. Numerous means have been devised in the prior art for controlling temperatures of milling rolls. None of these devices, however, are directed toward the problem of eliminating the temperature gradient along the longitudinal axis of the roll.

Moreover, none of the prior art devices are adapted to sense the temperature gradient so that proper steps can be taken to correct it. Furthermore, the prior art devices for sensing roll temperature are subject to certain disadvantages that render them inaccurate and hence inadequate. For example, it has been the practice to place a thermocouple in contact with the roll surface. The thermocouple, being held stationary relative to the roll surface, creates a certain amount of friction which induces error in the response generated by it. A still further disadvantage of a thermocouple in this instance is that it is subject to wear and consequently has a rather short useful life. This means that the thermocouple must be replaced at rather frequent intervals which results in rather high maintenance costs.

Therefore, one object of the invention is to provide means for accurately measuring the temperature of a milling roll.

Another object of the invention is to provide novel apparatus and method for sensing temperature gradient along the longitudinal axis of a milling roll.

Another object of the invention is to provide apparatus for controlling and preventing temperature gradient induced into milling rolls.

A still further object of the invention is to provide apparatus for controlling the temperature gradient induced into milling rolls that is of a simple and economical construction and is adapted to be used with commercial milling rolls.

These objects and still others will be apparent upon reading the specification, with reference to the following drawings.

The apparatus and method which embody the invention are shown by way of example as used in conjunction with rolls for milling steel. It will be apparent, however, upon reading the specification, that the apparatus and methods may be used on rolls that are used in various other processes and in no manner are to be limited for rolls for processing steel or metal plate.

As was mentioned previously, it has been found that during the rolling process a temperature gradient is developed between the ends and the center of the roll. Many times this gradient will exceed 100° F., particularly in the rolling of metals. When such a temperature gradient occurs, the roll will tend to distort the metal and will cause its properties to vary along its transverse cross-section. One explanation for this temperature gradient is that the roll is generally supported by metal spokes or the like which radiate outwardly from the roll shaft and contact the roll surface near its longitudinal ends. By the natural laws of conduction part of the heat is transmitted to the support means. As a result the temperature at the ends of the roll is less than at its center. One source of heat causing a temperature increase of the rolls is the working of the material being passed through the rollers. Heat from this source is a natural phenomenon and is a major factor in operations such as the cold rolling of steel. Another source of heat is from material that has been preheated prior to rolling such as in hot rolling of steel.

Figure 1:
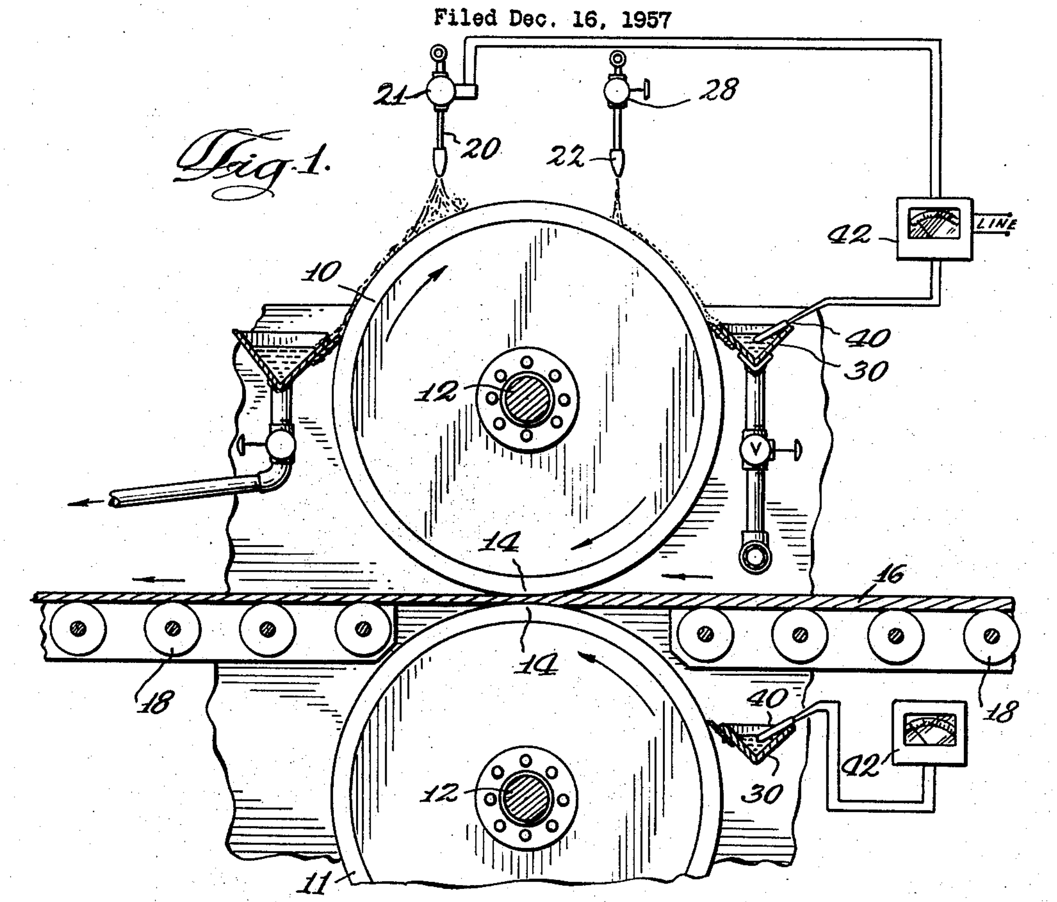
Figure 1 is a side view in elevation representative of the apparatus for measuring and controlling the temperature gradient of a milling roll embodying the invention.

Referring now to the drawings, there is shown in Figure 1 a typical pair of milling rolls comprising an upper roll 10 and a lower roll 11 that are used for rolling of metals. These rolls are mounted on the shafts 12 in any suitable manner such as that shown in the drawings, and are held in closely spaced relationship as shown at the numeral 14. Passing between the rolls 10, 11 is the metal plate 16 which is supported on the conveyor rolls 18. As shown in the drawing, the metal is reduced in cross-section by the roll pressure as it passes between the rolls 10, 11. This reduction in cross-section is caused by a considerable amount of work imparted by the rolls 10, 11, which generates a large amount of heat. This heat for a large part is absorbed by the roll so as to cause its temperature to increase. However, if the temperature of the roll becomes too high, it will cause the properties of the metal to be varied from that desired. Therefore, it is necessary to provide some means for cooling the rolls. This means is in the form of a plurality of the spray nozzles 20 which direct a water spray against the face of the roll. The nozzles are regularly spaced along the longitudinal axis of the rolls and each nozzle is adapted to direct its spray within a particular zone substantially contiguous with those of the preceding and succeeding nozzles. The water may be taken from any suitable source and the amount controlled by the apparatus and method described hereafter. Liquid distribution means other than spray nozzles may be used; however, spray nozzles were selected because of their efficiency of distribution of the water against the roll surface. A second series of nozzles 22 is regularly spaced along the longitudinal axis of the roll. These nozzles are adapted to direct a spray of water at a constant rate against the face of the roll as shown in the drawing for reasons that will be apparent later on. The nozzles are supplied from a suitable source through the conduit 24. Each of the nozzles is connected by means of a branch line 26 in which is located a constant volume valve 28 of some suitable type. It should be pointed out that the liquid discharged from the nozzles 22 should be at some predetermined temperature, for reasons that will be apparent later on.

Figure 2:
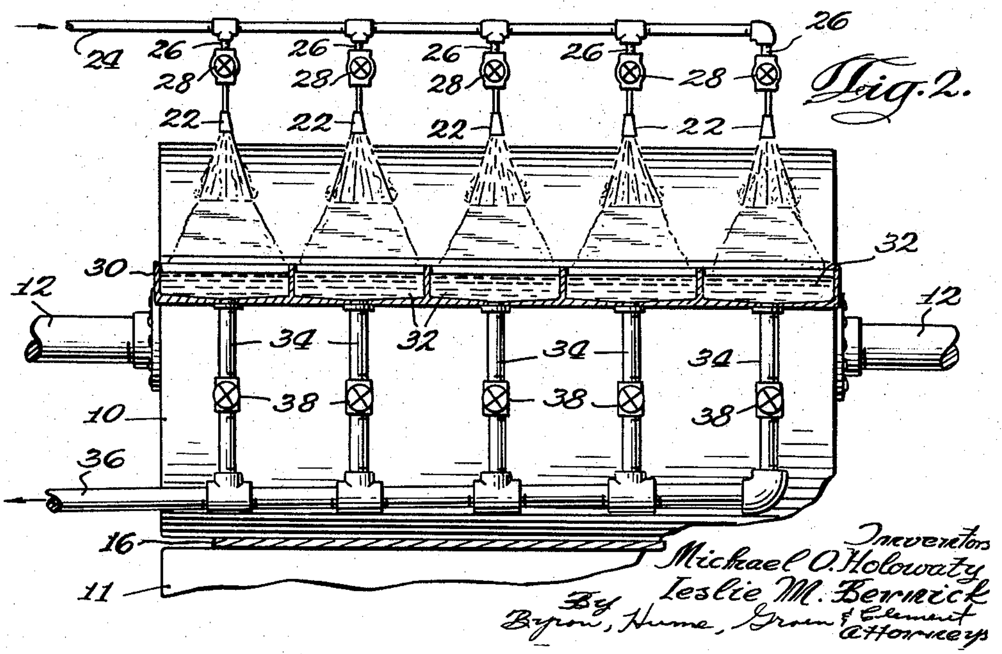
Figure 2 is a front view in elevation of the apparatus shown in Figure 1 embodying the invention with some of the parts deleted for purposes of clarification.

As shown in Figure 2, the spray from each nozzle is directed into a separate but substantially contiguous zone from the adjacent nozzles. Each of these zones is aligned with one of the zones formed by the nozzles denoted by the numeral 20. The spray from each nozzle 22 after contacting the surface of the roll 10 is allowed to run down its face until it is collected in trough 30. The trough 30 is held along the face of the roll in a position substantially parallel with the longitudinal axis of the roll. As shown in Figure 1, the trough has a generally V-shaped cross section with one of its legs in closely spaced relationship with the face of the roll. A doctor knife or squeegee member which is held in contact with the roll face may be used for directing the water from the nozzles 22 into the trough as shown.

The trough 30 is divided into a series of compartments 32. Each of said compartments is aligned with one of the nozzles 22 for receiving the spray therefrom after it has come in contact with the roll face. The trough 30 and the compartments 32 are so positioned that each of the compartments is aligned with the spray zones that were previously mentioned in conjunction with nozzles 22. Therefore, the water received in any one compartment is substantially all of that discharged from the associated nozzle. Each of the compartments is provided with a drain pipe 34 which in turn is connected to some suitable discharge means 36. In each of the drain pipes 34 is a valve 38 of some suitable type for maintaining the compartments 32 partially filled with water. The amount retained in each compartment should be sufficient to enable an accurate determination of the temperature thereof and may be varied to suit the individual needs of any particular system.

Referring back to Figure 1, there is shown a representative illustration of one of a series of thermocouples 40 respectively disposed in the compartments 32 of the trough 30 and held there by any suitable means. It will be apparent upon further development of the specification that other thermal sensing devices may be substituted for the thermocouple and that the invention is not limited to any one particular type. Each of the temperature sensing elements generates an electrical signal which in turn is communicated to one of a like plurality of indicating devices 42. A trough, thermocouples and indicating devices 42 are shown associated with the lower roll 11 as representative of a system used in that manner.

The invention as described is particularly adapted to indicate roll temperature; however, it may be correlated to indicate the approximate absolute temperature. If it is desired to control or eliminate the temperature gradient along the longitudinal axis of the roll, then it would only be necessary to sense relative temperatures. In that instance the correlation would be based on the following formula:

$$Q=Vp\Delta t$$

where Q is equal to the amount of heat transferred to the water collected in each of the compartments;

V is equal to the volume of water discharged by each of the nozzles per unit of time;

$p$ is equal to the specific heat of water; and $\Delta t$ is equal to the increase in temperature of the water after it comes in contact with the roller surface.

According to the natural laws of heat transfer, it is apparent that $\Delta t$ is a function of the roller temperature. In other words, if the roller temperature is relatively high, the $\Delta t$ will be proportionately greater.

On the other hand, if it is desired to sense absolute temperatures, so as to control the temperature of the roll, then the correlation would be based on the following formula:

$$Q=AU\Delta t_m$$

where Q is equal to the amount of heat transferred to a given volume of water;

A is equal to the surface area of the roll with which the water comes into contact;

U=the overall heat transfer of the system; and $\Delta t_m$—the mean temperature differential between the roller surface and the water.

It is apparent that by determining the proper values for Q, A, U, and the incoming and outgoing water temperatures, the surface temperature of the roller can be closely approximated. In this manner the indicator 42 can be correlated to sense absolute temperatures of the respective zonal areas for each of the spray nozzles.

As shown in Figure 1, the nozzles 20 and 22 are remotely positioned from each other so that their respective sprays will not coincide so as to introduce error into the previously described sensing device. Each of the nozzles 20 is provided with a valve means 21 which permits control thereof. The nozzles 20 are used to control the temperature of a particular zone of the roller 10 whereas the nozzles 22 are used for purposes of determining the temperature of corresponding zones. Therefore, the amount of water discharged from the nozzles 20 may be considerably greater than that from the nozzles 22. However, the former will vary considerably, depending upon the temperatures of the individual zones of the roller.

The flow rate from the nozzles 20 may be controlled by any one of numerous suitable means. Of course, one obvious means is the manual control by the operator tending the rolling mill. Another means such as that shown in Figure 1 are some suitable automatic controllers actuated by the sensing devices 40. The controllers could be incorporated in the indicators 42 or be remote therefrom and would be adapted to receive signals from the thermocouples 40 and in turn translate them to suitable valve mechanisms 21 adapted to be remotely controlled. In this manner the temperature of each zone can be accurately controlled. It should be mentioned that one zone can be used for a base line and the rest of the zones controlled relative thereto. This is particularly true where the system is used to eliminate temperature gradient. If, however, the system is used to maintain the entire roll at some predetermined temperature as well as eliminate temperature gradient, it may be necessary to control each zone independently of the others by means of absolute temperatures.

From the foregoing description it can now be seen that the subject invention can be used to accurately sense the temperatures of milling rolls. Furthermore, it is adapted to sense the temperatures of longitudinal zones of the roll. These temperatures may be either relative or absolute, depending upon whether it is necessary to maintain the temperature of the roller constant along its axis or whether it is necessary to maintain the temperature of the roller at some predetermined level.

This system requires little or no maintenance and is relatively simple and economical to install. Furthermore, it may be used in conjunction with existing milling rolls without any substantial alteration thereof. As was mentioned previously, the subject invention may be used with other types of milling rolls and is not limited to those which are used for processing metals.

It is to be understood that although certain specific examples and terminology were used in the specification, these were merely by way of example and are not to be construed as limitations. It will be apparent that certain modifications of the invention may be made within the scope of the claims without departing from the spirit of the invention.

It is claimed:

1. An apparatus for measuring the temperature of a roller comprising a series of spray nozzles spaced longitudinally along a roller, each of said spray nozzles being adapted to direct a spray at a predetermined rate on the roller, means adapted to be positioned adjacent the periphery of the roller for receiving the liquid discharged from each said nozzles, and temperature measuring means mounted in each of said means for sensing the liquid temperature, each of said temperature measuring means being correlated to indicate the temperature of said roller.

2. An apparatus for measuring the temperature of a roller comprising a series of spray nozzles spaced longitudinally along a roller, each of said spray nozzles being adapted to direct a spray at a predetermined rate along a respective longitudinal segment of said roller, means coincident with the respective longitudinal segments adapted to receive the liquid discharged thereon, and temperature measuring means mounted in each of said means for sensing the liquid temperature, each of said temperature measuring means being correlated to indicate the temperature of said longitudinal segment associated therewith.

3. An apparatus for measuring the temperature of a roller comprising a series of spray nozzles regularly spaced longitudinally along a roller, each of said spray nozzles being adapted to direct a spray at a predetermined rate on a longitudinal segment of the roller, trough means mounted adjacent the surface of the roller coincident with each of the respective longitudinal segments so as to receive the liquid dispensed thereon, and temperature measuring means within each of said trough means for sensing the liquid temmperature measuring means being correlated to indicate the relative temperatures of said longitudinal segments.

4. An apparatus for measuring the temperature of a roller comprising a series of spray nozzles spaced along a roller, said spray nozzles being adapted to direct a liquid spray at a predetermined rate along a plurality of distinct longitudinal segments on the roller, trough means mounted adjacent the surface of the roller, said trough means being divided into a plurality of compartments, each of said compartments being adapted to receive the liquid from one of said longitudinal segments, respectively, from one of said spray nozzles, and temperature measuring means within each of said compartments, said temperature means being correlated to indicate the relative temperatures of said longitudinal segments.

5. In an apparatus for controlling the temperature of a roller the combination comprising a series of spray nozzles regularly spaced along a roller, said spray nozzles being adapted to direct a liquid spray at a predetermined rate along a plurality of distinct longitudinal segments on the roller, trough means mounted adjacent the peripheral surface of the roller, said trough means being divided into a plurality of compartments, each of said compartments being adapted to receive the liquid from one of said longitudinal segments, respectively, from one of said spray nozzles, and temperature measuring means within each of said compartments, said temperature means being correlated to indicate the relative temperatures of said longitudinal segments.

6. An apparatus for measuring the temperature of a roller comprising a series of spray nozzles regularly spaced along a roller, said spray nozzles being adapted to direct a liquid spray at a predetermined rate along a plurality of distinct longitudinal segments on the roller, trough means mounted adjacent the peripheral surface of the roller, said trough means being divided into a plurality of compartments, each of said compartments being adapted to receive the liquid from one of said longitudinal segments, respectively, from one of said spray nozzles, and means for measuring the temperature of the liquid received in each of said compartments, said means being adapted to indicate the relative temperatures of said longitudinal segments.

7. An apparatus for controlling the temperature of a roller comprising a series of spray nozzles regularly spaced longitudinally along a roller, each of said spray nozzles being adapted to direct a spray at a predetermined rate along selected longitudinal segments of the roller, a trough means longitudinally adjacent the roller, said trough means being divided into a series of compartments, each of said compartments being coincident with one of said longitudinal segments, respectively, and mounted so as to receive the liquid discharged therefrom, temperature measuring means mounted in each of said compartments, a second series of spray nozzles remote from said first series of spray nozzles adapted to direct a liquid spray on said roller, and means actuated by said temperature measuring means for controlling said second series of spray nozzles.

8. An apparatus for measuring the temperature of a roller comprising a plurality of constant volume spray nozzles, said spray nozzles adapted to direct a spray on a roller in a plurality of substantially separate areas, means mounted adjacent the peripheral surface of said roller for collecting the water from each of said areas, and means for measuring the temperature of the water collected from each of said areas.

9. An apparatus for measuring the temperature of a roller comprising a plurality of constant volume spray nozzles, said spray nozzles adapted to direct a spray on a roller in a like plurality of substantially separate areas, means mounted adjacent the peripheral surface of the roller for collecting the water from each of said areas, and means for measuring the temperature of the water collected from each of said separate areas.

10. A method for measuring the longitudinal temperature gradient of a roller comprising directing a plurality of liquid sprays on a like plurality of longitudinal segments of said roller, collecting the liquid dispensed on each of said segments, and measuring the temperature of the collected liquid from each segment.

11. A method for measuring the longitudinal temperature gradient of a roller comprising directing a plurality of liquid sprays of a constant rate on a like plurality of longitudinal segments of said roller, collecting the liquid dispensed on each of said segments, and measuring the temperature of the collected liquid from each segment.

12. A method for measuring the longitudinal temperature gradient of a roller comprising directing a plurality of liquid sprays on a like plurality of longitudinal segments of said roller, and measuring the temperature of the liquid dispensed on each of said segments.

13. A method for measuring the longitudinal temperature gradient of a roller comprising dispensing liquid so as to form a plurality of streams on a like plurality of longitudinal segments of the peripheral surface of a roller and measuring the temperature of the liquid of each of the streams after contact with the peripheral surface of the roller.

14. A method for measuring the longitudinal temperature gradient of a roller comprising dispensing liquid so as to form a plurality of streams on a like plurality of longitudinal segments of the peripheral surface of a roller, collecting the liquid in each of the streams after contact with the roller surface, and measuring the temperature of the collected liquid from each of the streams.

References Cited in the file of this patent

UNITED STATES PATENTS

| | | |
|---|---|---|
| 1,978,895 | Clark | Oct. 30, 1934 |
| 1,994,721 | Lorig et al. | Mar. 19, 1935 |
| 2,017,403 | Lorig et al. | Oct. 15, 1935 |
| 2,095,877 | Junkins | Oct. 12, 1937 |

UNITED STATES PATENT OFFICE
CERTIFICATION OF CORRECTION

Patent No. 2,957,349 October 25, 1960

Michael O. Holowaty et al.

It is hereby certified that error appears in the above numbered patent requiring correction and that the said Letters Patent should read as corrected below.

Column 5, line 8, after "each" insert -- of --; line 33, for "temmperature" read -- temperature, said temperature --.

Signed and sealed this 13th day of June 1961.

(SEAL)
Attest:

ERNEST W. SWIDER
Attesting Officer

DAVID L. LADD
Commissioner of Patents